United States Patent [19]

Grenoble et al.

[11] 4,421,637

[45] * Dec. 20, 1983

[54] CATALYTIC CRACKING PROCESS WITH SIMULTANEOUS PRODUCTION OF A LOW BTU FUEL GAS AND CATALYST REGENERATION

[75] Inventors: Dane C. Grenoble, Baton Rouge, La.; Walter Weissman, Berkeley Heights, N.J.

[73] Assignee: Exxon Research and Engineering Co., Florham Park, N.J.

[*] Notice: The portion of the term of this patent subsequent to Jan. 13, 1998 has been disclaimed.

[21] Appl. No.: 332,161

[22] Filed: Dec. 18, 1981

Related U.S. Application Data

[63] Continuation-in-part of Ser. No. 203,139, Nov. 3, 1980, abandoned, which is a continuation-in-part of Ser. No. 927,830, Jul. 25, 1978, Pat. No. 4,244,811.

[51] Int. Cl.³ ............................................. C10G 11/04
[52] U.S. Cl. .............................. 208/120; 208/52 CT; 208/119; 502/55; 502/38
[58] Field of Search .................. 208/119, 120, 52 CT; 252/411 R, 420

[56] References Cited

U.S. PATENT DOCUMENTS

| | | | |
|---|---|---|---|
| 2,124,586 | 7/1938 | Morrell et al. | 208/122 X |
| 2,396,641 | 3/1946 | Connolly | 208/123 |
| 2,726,234 | 12/1955 | Field et al. | 252/458 X |
| 2,817,626 | 12/1957 | Mabry et al. | 252/456 X |
| 2,849,383 | 8/1958 | Hirschler et al. | 208/119 |
| 4,244,811 | 1/1981 | Grenoble et al. | 208/120 X |
| 4,269,737 | 5/1981 | Grenoble et al. | 252/458 X |

OTHER PUBLICATIONS

Shankland & Schmitkons "Determination of Activity and Selectivity of Cracking Catalyst" Proc. API 27 (III) 1947, pp. 57–77.

*Primary Examiner*—Curtis R. Davis
*Assistant Examiner*—George Schmitkons
*Attorney, Agent, or Firm*—Edward M. Corcoran

[57] ABSTRACT

A process for catalytically cracking a hydrocarbon with simultaneous production of a low BTU fuel gas and catalyst regeneration comprising contacting a hydrocarbon feed, at elevated temperature and in a cracking zone, with a solid acid catalyst comprising a catalytic metal oxide component wherein said metal is selected from the group consisting essentially of (a) tungsten, niobium and mixtures thereof (b) mixture of (a) with tantalum, hafnium, chromium, titanium, zirconium and mixtures thereof, said oxide component being supported on a silica-containing inorganic refractory metal oxide support having a silica content less than 50 wt. % of the total support, to produce a cracked product and a deactivated catalyst and regenerating the deactive catalyst to produce a low BTU gas rich in CO, a gas rich in $H_2$, or both and recirculating the regenerated catalyst back to the cracking zone, said catalyst being steamed prior to use at a temperature at least 600° C. In a preferred embodiment, the catalyst support will comprise a mixture of silica and γ-alumina.

16 Claims, No Drawings

CATALYTIC CRACKING PROCESS WITH SIMULTANEOUS PRODUCTION OF A LOW BTU FUEL GAS AND CATALYST REGENERATION

CROSS REFERENCE TO RELATED APPLICATIONS

This application is a Continuation-in-Part of Ser. No. 203,139, filed Nov. 3, 1980, (now abandoned), which in turn is a Continuation-in-Part of Ser. No. 927,830, filed July 25, 1978, now U.S. Pat. No. 4,244,811.

BACKGROUND OF THE INVENTION

1. Field of the Invention

This invention relates to a process for catalytically cracking hydrocarbons with the simultaneous production of a low BTU fuel gas. More particularly, this invention is a process for catalytically cracking hydrocarbon feeds over solid acid catalysts comprising a catalytic metal oxide component wherein said metal is selected from the group consisting essentially of (a) tungsten, niobium and mixtures thereof and (b) mixtures of (a) with tantalum, hafnium, chromium, titanium, zirconium and mixtures thereof, said metal oxide component being supported on a silica-containing inorganic refractory metal oxide support, the silica content of which is less than 50 wt.% calculated as $SiO_2$ and simultaneously producing a low BTU value fuel gas via regeneration of the deactivated and coked catalyst resulting from cracking the feed.

2. Background of the Disclosure

A typical conventional process for the conversion of heavy hydrocarbon feeds (resids, coal liquids) is fluid coking. Ordinarily the process operates with two fluidized beds, a reactor and a burner. The hydrocarbon feed is injected into the reactor where it is thermally cracked to form vapor phase products and coke. Alternatively, heavy feeds can be catalytically cracked. This process also functions with multiple fluidized beds with catalyst recirculating between a reactor and a regenerator. The feed to be cracked is injected, with the hot, regenerated catalyst into the reactor where the cracking reaction occurs. The hydrocarbon products and the catalyst are separated by steam stripping; the products are sent to a fractionator and the catalyst is transferred to the regenerator. In the regenerator deposited coke is removed by burning in air and the regenerated catalyst is than returned to the reactor. Depending on the catalyst used, regenerator temperatures are between 1200° and 1400° F. (650°–760° C.). There are currently three catalysts commonly in use for catalytic cracking: silica-alumina, zeolite silica-alumina mixtures and silica-magnesia.

To avoid serious catalyst deactivation and excessive coke make, petroleum feeds sent to cat cracking processes are normally restricted to the vacuum gas oil fraction boiling below 1050° F. This is directly related to the large amount of metals in the 1050° F.+ material that contaminates the catalyst and the large amount of Conradson Carbon coke forming precursors in the 1050° F.+ material. Techniques are available to mitigate the effects of deposited metals, e.g., antimony addition, however, the high content of coke precursors in 1050° F.+ materials still make direct processing in cat cracking problematic. Presently, catalysts which have become deactivated due to coke deposition are regenerated by burning the coke. If unhydrotreated 1050° F.+ was processed in large quantities in cat cracking the amount of coke produced would be greater than the amount that could be burned in the regenerator to sustain the unit in heat balance. The heat produced by burning off the excess coke would likely have to be used in the production of relatively low value steam. This will be accomplished by incorporation of steam boiler tubes in the regenerator bed. Ideally, however, the coke should be converted into valuable products since the coke for a 1050° F.+ material represents about 25% of the total material fed into the cat cracking unit; about three quarters of which is in excess over the amount that would be burned to sustain the unit in heat balance. In order to convert the coke into commercially valuable products it must be gasified, that is, reacted with an oxygen-containing and/or steam-containing gas at temperatures of 1600°–1800° F. (870°–980° C.).

One of the main drawbacks in attempting to utilize this coke gasification in a typical cat cracking process is the extreme sensitivity of the prior art catalysts to high temperatures in the presence of steam. While the coke may indeed be gasified the catalyst is irreversibly deactivated, thereby resulting in a very high debit in operations. Consequently, to avoid destroying the catalyst, the coke is merely burned at low temperatures (<1400° F.) and when this quantity of coke is greater than the amount needed to sustain heat balance, the excess is used to produce steam for the refinery, an equally pernicious result considering that coal could be most readily used in large stationary combustors such as steam boilers. In order to achieve maximum material efficiency and practice cat cracking of substantial quantities of 1050° F.+ streams, it will be necessary to simultaneously practice both coke gasification and catalyst regeneration. To do this, an exceptionally long lived, active, stable catalyst will be needed.

With the incorporation of gasification, the coke gas produced is mainly a mixture of $CO$, $CO_2$, $H_2$, $H_2O$, $H_2S$ and $N_2$ if air is employed. The $H_2S$ can be removed by technology such as the Stretford process, thereby a clean $H_2$-$CO$ containing gas might be produced for a wide range of uses -e.g. process furnaces, fuel gas, $H_2$ manufacture, etc. Gasification is therefore a more efficient utilization of this potential coke energy contained in each barrel of feed. For the case where air is used as the gasification medium, the coke gas produced, about $10^4$ SCF/bbl, would have an energy content of about 100 BTU/SCF.

Cracking of petroleum fractions over acid catalysts represent the most widely used means of molecular weight reduction in refining processes. In order to achieve hydrocarbon cracking in the presence of steam, the catalyst used in the process must retain a high level of acid cracking activity in the presence of steam.

Most of the conventional acid catalysts used in catalytic cracking processes are known to be unsuited for use in the presence of steam at temperatures greater than about 1400° F. (760° C.). The effects of water are considered to be those of a structural poison and result in a weakening of the acid strength of the acid sites. Stability in high steam environments is desirable however, since one way of removing the coke which is inevitably deposited on the catalyst is to steam gasify the coke on the catalyst. The burning off of the coke necessarily requires the presence of steam.

U.S. Pat. Nos. 4,269,737, 4,233,139 and 4,244,811, the disclosures of which are incorporated herein by reference, disclose solid acid catalysts comprising certain supported transition metal oxides, their preparation and use as acid cracking catalysts. The supports are silica-free refractory metal oxides which are not in themselves acid cracking catalysts, but which when combined with the transition metal oxide component result in acid cracking catalysts. These catalysts are taught as having enhanced activity and selectivity towards forming liquid products compared to conventional acid catalysts. They also exhibit remarkable resistance to coke make and have unusual steam stability. In fact, in some cases it is preferred to pre-steam these catalysts prior to use in order to stabilize the surface thereof. Although steaming these catalysts initially results in a decrease of both surface area and strong acid sites, the steaming itself serves to stabilize the remaining surface area and acidity which is not substantially adversely affected by subsequent steaming. The catalysts described in these patents exhibit primarily Lewis acidity.

U.S. Pat. No. 2,849,383 discloses silica-alumina cracking catalysts which may contain tungsten oxide as a component thereof, which catalysts are steamed at a temperature of from about 600°–800° C. prior to use. However, the disclosures of this patent are very specific in teaching that the silica content of the catalyst support should be at least above about 50% silica calculated as $SiO_2$ and preferably between 50 and 90 wt.% silica, with the balance being alumina.

SUMMARY OF THE INVENTION

The present invention is a process for catalytically cracking hydrocarbons followed by simultaneous gasification and catalyst regeneration. Thus the present invention is a process for catalytically cracking a hydrocarbon with simultaneous production of a low BTU fuel gas in the catalyst regeneration, said process comprising contacting a hydrocarbon feed at elevated temperature and in a cracking zone, with a soid acid catalyst comprising a transition metal oxide catalytic component on a silica-containing refractory metal oxide support to produce a cracked product and a deactivated catalyst and regenerating the deactive catalyst to produce a low BTU gas rich CO, a gas rich in $H_2$, or both and recirculating the regenerated catalyst back to the cracking zone, said catalyst being steamed prior to use at a temperature of at least 600° C. In a preferred embodiment, the catalyst support will comprise a mixture of silica and γ-alumina. More particularly, this invention is a process for catalytically cracking a hydrocarbon feed and simultaneously generating a low BTU gas or hydrogen rich gas, said process comprising the steps of:

(1) contacting, in a cracking zone and at elevated temperature, a hydrocarbon feed with an acid catalyst comprising a catalytic metal oxide component wherein said metal is selected from the group consisting essentially of (a) tungsten, niobium and mixtures thereof (b) mixtures of (a) with tantalum, hafnium, chromium, titanium, zirconium and mixtures thereof, said metal oxide component being supported on a silica-containing inorganic refractory metal oxide support the silica content of which is less than 50 wt.% of the total support, for a time sufficient to effect the desired cracking of the feed and yield a coked catalyst, said catalyst being steamed at a temperature of at least 600° C. prior to use:

(2) regenerating the coked catalyst at regenerating conditions by contacting same with steam, oxygen-containing gas or mixture thereof to produce a regenerated catalyst and a $H_2$ rich gas, a low BTU gas rich in CO and a combination thereof; and (3) recirculating the regenerated catalyst of step (2) back to the cracking zone of step (1).

The process of this invention will be extremely useful when used in connection with cracking relatively heavy hydrocarbon feedstocks such as whole or reduced crudes, resides, as well as synthetic feeds derived from the liquefaction of coal, from tar sands, shale oil, Cold Lake crude, etc., which feeds have relatively large coke makes.

DETAILED DESCRIPTION

When partial combustion is employed to regenerate the coke catalyst, small amounts of steam may be added along with the air or oxygen-containing gas in order to absorb a portion of the exothermic heat of reaction. However, when steam gasification is employed to regenerate the catalyst, one must employ an external means in order to provide the endothermic heat required for the steam gasification reaction. This may be accomplished by adding to the gasification zone oxygen, air or an oxygen containing gas along with the steam or, alternatively, by circulating thereinto hot catalyst particles from a combustion zone wherein at least a portion of the coke on the coked catalyst is burned.

The hot, regenerated catalyst may be recirculated or returned directly back to the hydroconversion or cracking zone in order to provide the heat required for the endothermic cracking reaction. In general, the process of this invention is similar to current cat cracking processes except for the option of including steam both in the hydroconversion or cracking zone and also in the regenerating zone. Steam will be used in the regenerating zone if one wishes to produce from the coke (i) a gas having a heating value of greater than about 100 BTU/SCF or (ii) or chemical raw material useful for manufacturing hydrocarbons from the $CO/H_2$ mixture via Fischer Troph Synthesis.

Any useful hydrocarbon feedstock may be employed in the process of this invention including both natural and synthetic feeds such as whole or topped crude oils, resids, synthetic fuels derived from the liquefication of coal, from shale oil, from Cold Lake crude, etc.

Illustrative, but non-limiting examples of the process of this invention include gas oil cat cracking, reside cat cracking, heavy ends cat cracking, acid hydrocracking, etc. Further, because the catalysts of this invention are resistant to steam under conditions of high temperature, one may, if desired, have steam present in the hydrocracking or hydroconversion zone.

Typical conditions employed in the hydroconversion or the hydrocracking zone of the process of this invention will include temperatures broadly ranging from about 300°–900° C., preferably 400°–600° C. at pressures ranging from at about 0 to 10,000 psig, preferably 50–500 psig. Contact times of the catalyst with the feed can range from less than 1 second to as much as 2,000 seconds or more, preferably from about 1–120 seconds. Space velocities will generally range from about 0.1 to 50 wt.% feed/hr/wt. catalyst (WHW, preferably 1–4 WHW). As stated above, $H_2O$ as steam may be employed in the conversion zone along with the hydrocarbon feed. When steam is employed in the conversion zone, the mole ratio of $H_2O$ to the hydrocarbon feed will generally range from about 0.5:1 to 20:1 and preferably from about 1:1 to 10:1.

To regenerate the catalyst, the typical conditions employed in the regenerator comprise a pressure not greater than 150 lbs. psig., preferably not greater than 60 psig., more preferably not greater than about 45 psig. The temperature is maintained at a level in the range of about 1400°–2800° F. (760°–1535° C.), preferably at a temperature greater than about 1500° F., more preferably at a temperature in the range of about 1600° to 1900° F., most preferably at a temperature in the range of about 1700° to 1800° F. The coked catalyst is treated under the above conditions in the regenerator in the presence of steam and an oxygen containing gas to produce a hot gaseous steam containing $H_2$ and CO. The conversion of coke into CO and $H_2$ proceeds by the following scheme:

(1) $(n+1)\ C+(0.5+n)\ O_2 \rightarrow CO+nCO_2$
(2) $CO+O_{2/2} \rightarrow CO_2$
(3) $CO_2+C \rightleftharpoons 2CO$
(4) $H_2O+C \rightleftharpoons H_2+CO$
(5) $H_2O+CO \rightleftharpoons CO_2+H_2$ When coke is oxidized, the initial product is a mixture of CO and $CO_2$ as shown in equation (1). At temperatures of 1600° F.+ in the presence of oxygen CO is rapidly oxidized to $CO_2$ according to equation (2). After oxygen has been exhausted, $CO_2$ reacts with carbon to form CO. At high temperatures, equilibrium favors drawing equation (3) to the right to form CO. Low pressure also favors this reaction. Reaction (3) is slower than reaction (2). Thus, equilibrium would favor very high $CO/CO_2$ ratios at conditions of 1700° F.–1750° F.+ and pressures of 2.7 atm or lower in the gasifier.

Steam will also gasify coke as represented by equation (4). This reaction is endothermic and when steam is substituted for some of the oxygen, the gasification zone temperature drops at a constant quantity of coke gasified. Finally, water reacts with CO to produce $CO_2$ and hydrogen in the water gas shift represented by equation (5). Most of the sulfur in the coke will be converted to $H_2S$ with a very small amount of COS being formed.

In order to obtain significant conversion of coke to low BTU gas, it is necessary to gasify at temperatures in the range of 1600°–1800° F. These high temperatures in the presence of the steam normally contained in a regenerator place severe requirements on the stability of cracking catalysts. In order for this type of process to be practical, the catalyst used must be able to withstand these severe conditions.

As set forth above, catalysts useful in the process of the invention will comprise a catalytic transition metal oxide component on a support which comprises a mixture of silica with at least one other refractory metal oxide, wherein the silica content of the support is less than 50 wt.% calculated as $SiO_2$. Suitable examples of other refractory metal oxides as co-components of the support include, but are not limited to, alumina, zirconia, boria, thoria, titania, chromia, kieselguhr and mixtures thereof, as well as compounds of two or more support materials (such as zirconium titanate) alone or mixed with other support materials. In a particularly preferred embodiment, the support will comprise a mixture of silica and alumina, most preferably, a mixture of silica and γ-alumina. In any event, the silica content of the support should be less than 50 wt.% thereof calculated as $SiO_2$, preferably less than 25 wt.% and still more preferably no greater than about 15 wt.% thereof. The support should have a high surface area in the region of from about 20 to 500 m²/g, preferably 40 to 200 m²/g and most preferably over 100 m²/g. These surface areas are surface areas of the support alone, without any transition metal oxide thereon and are as measured by the Brunauer-Emmett-Teller (BET) method.

The catalysts of this invention may be prepared by techniques well-known in the art, such as incipient wetness, impregnation, etc., the choice being left to the practitioner. When using the impregnation technique, the impregnating solution is contacted with the support material for a time sufficient to deposit the precursor material onto the support either by selective adsorption or alternatively, the excess solvent may be evaporated during drying leaving behind the precursor salt. Advantageously, incipient wetness techniques may also be used. The choice of catalyst preparation method is left to the practitioner. The transition metal oxide salt solution used in preparing the catalyst of this invention may be aqueous or organic, the only requirement being that an adequate amount of precursor compound for the selected transition metal oxide be soluble in the solvent used in preparing this solution.

The catalysts of this invention may also advantageously contain minor amounts of various promoter materials selected from one or more oxides of Group IIA. Particularly preferred are oxides of barium, calcium, strontium and mixtures thereof. These promoter materials, in the form of precursor salts, can be incorporated into the carrier simultaneously with the transition metal oxide precursor salt, or sequentially (the order of addition being merely a matter of choice), or may be coprecipitated with the support material. Alternatively, they may be added subsequent to the formation of the catalyst composite. If used at all these promoters will be present in an amount ranging from about 0.01 to 4.0 wt.% promoter based on the total catalyst composition.

The final catalyst composite will then normally be dried at temperatures ranging from about 50°–300° C. to remove the excess solvent and, if necessary decompose the salt if it is an organic salt. The transition metal oxide precursor is then converted into the oxide form by calcining at temperatures of from about 150° to 800° C. and preferably 300°–700° C. in a suitable oxidizing atmosphere such as air, oxygen, etc. Reducing atmospheres may also be used to decompose the transition metal oxide precursors, but the resulting composite will then require subsequent calcination to convert the reduced metal component to the oxide form. Following the calcination, the composite will then be subjected to high temperature steaming prior to use for period of from about 0.1 to 60 hours, preferably 1–16 hours at temperatures in excess of about 600° C. Suitable steaming temperatures will generally range from about 600°–1200° C. and preferably from about 700°–1200° C. The steam atmosphere will comprise from about 0.1 to 100% steam with a balance being gases that are inert to and which will not adversely affect the catalyst composition such as oxygen, air, nitrogen, noble gases, etc.

The catalysts of this invention will generally have metal oxide loadings of from about 0.5 to 25 wt.% transition metal oxide based on the total catalyst composition, preferably from about 1 to 10 wt.%, more preferably from about 2–8 wt.% and most preferably from about 4–8 wt.% based on the total catalyst composition. When the catalytic metal oxide comprises a mixture of tungsten, niobium and mixtures thereof in combination with one or more oxides of tantalum, chromium, titanium, zirconium, hafnium and mixtures thereof, the ratio of tungsten oxide, niobium oxide or mixture thereof to the additional transition metal oxide or oxides will be at least about 1 to 1, preferably about 3 to 1 and still more preferably about 9 to 1.

The invention will be more readily understood by reference to the examples below:

EXAMPLES

EXAMPLE 1

In this example, alumina-silica cogels were made by taking mixtures of methanol solutions of aluminum isobutoxide and ethylorthosilicate to which distilled water was slowly added under conditions of agitation which precipitated the alumina-silica cogel. The so-formed precipitate was then filtered, washed with additional distilled water, dried in air at 110° C. and calcined in air for 16 hours at 500° C. This resulted in an alumina-silica cogel powder which was used as the catalyst substrate. The substrate powder was impregnated with an aqueous solution of ammonium meta-tungstate using the incipient wetness technique. The resulting catalyst precursor was then dried in vacuum at 120° C. for 16 hours, calcined in flowing air at 500° C. for 16 hours followed by steaming at 870° C. for 16 hours in a tube furnace in an 80/20 helium/oxygen mixture that had been sparged through water. The steamed catalyst was then pilled to a 20/40 mesh size.

Four different alumina-silica cogel supports were prepared containing 5 wt.% silica, 15 wt.% silica, 25 wt.% silica, and 45 wt.% silica calculated as $SiO_2$. To these supports was added a sufficient amount of the ammonium meta-tungstate to result in a finished catalyst containing either 6 or 10 wt.% tungsten oxide on the support, the amount of tungsten oxide being based on a total catalyst composition.

The so-formed catalysts of this invention were then evaluated for gas oil cracking activity in a micro activity test unit (MAT) modified to allow for water addition (steam) along with the feed. The MAT unit is recognized in the industry as a standard diagnostic test unit for cat cracking catalysts (see Ciapetta, F. G. and D. J. Henderson, Oil and Gas J 65 (72), 88, (1967) and Gustofson, W. R., Div. of Pet. Chem, ACS Preprints 14, B46 (1969).

The oil feed was an East Texas Light Gas oil having a boiling range of from 450°-700° F. The operating conditions for the tests were:

$H_2O$ Oil mole ratio=3/1
Temp. (catalyst) 900° F. (482° C.)
Pressure 1 atmosphere
(WHSV) oil 8hr⁻(weight hourly space velocity)

The information obtained from the tests was the overall vol. % conversion and the amount of conversion to 400° F. liquids (naphtha gasoline), coke and hydrogen gas.

The conversion data to coke and hydrogen are compared to a standard catalyst's performance under identical conversion levels. Thus, instead of presenting coke and hydrogen production values as absolute numbers, they are made relative to a conventional silica-alumina catalyst operated under identical conversion conditions. Thus, coke producing factor means the amount of coke produced on the experimental catalyst relative to that produced on a conventional silica-alumina cracking catalyst under identical conditions. Similarly, the hydrogen production factor is the amount of hydrogen produced by the experimental catalyst relative to the standard. Selectivity to 400-° F. liquids (gasoline) is the percentage of the total conversion by weight that went to 400-° F. liquids.

The results of these experiments are given in Table 1 and demonstrate both the usefulness of the catalysts of this invention as acid cracking catalysts, and the fact that it is preferred to have less than 50 wt.%, preferably less than 25 wt.% thereof and still more preferably no more than about 15 wt.% silica, calculated as $SiO_2$, in the support.

TABLE 1

CRACKING PERFORMANCE OF CATALYSTS IN MAT UNIT FOLLOWING STEAMING AT 870° C.

| Catalyst | MAT Activity | Coke/Producing Factor | Hydrogen Producing Factor |
|---|---|---|---|
| 10 wt. % $WO_3$ on 45/55 $SiO_2/Al_2O_3$ | 25 | 1.1 | 3.7 |
| 10 wt. % $WO_3$ on 25/75 $SiO_2/Al_2O_3$ | 35 | 1.12 | 4.6 |
| 6 wt. % $WO_3$ on 15/85 $SiO_2/Al_2O_3$ | 42 | 1.3 | 3.6 |
| 6 wt. % $WO_3$ on 5/95 $SiO_2/Al_2O_3$ | 39 | .95 | 1.5 |
| 10 wt. % $WO_3$ on $\gamma$-$Al_2O_3$* | 45 | 1.5 | 6.6 |

*Englehard industries reforming grade $\gamma$-$Al_2O_3$.

EXAMPLE 2

In this example, a number of experiments were conducted using silica-alumina supports wherein the silica was deposited onto the surface of the alumina as opposed to the co-gels of Example 1. These supports were prepared using an incipient wetness technique wherein a methanol solution of tetraethoxysilane was added to a standard, dehydrated, reforming grade of $\gamma$-$Al_2O_3$ (Englehard Industries).

For those supports containing either 2 or 3.4 wt.% silica, after the incipient wetness impregnation of the alumina with the methanol silane solution, the methanol was removed by evacuation over night followed by drying in flowing nitrogen for four hours at 120° C. After this, each sample was further heat treated in flowing nitrogen for one or two hours at 250° C., followed by one or two hours at 500° C. to decompose the silicon alkoxide. Each sample was then calcined in air for 16 hours at 500° C.

The 5 wt.% silica support was prepared in a different manner. After being impregnated with the silane, the methanol was not removed from the impregnated alumina prior to steaming. Instead the impregnated, methanol containing alumina was placed directly into a tube furnace wherein it was steamed for two hours at 120° C., then for two hours at 250° C. followed by increasing the temperature to 500° C. over a period of one hour. The steaming was done by contacting the sample with a flowing 80/20 helium/oxygen mixture that had been sparged through water. After the steaming treatment, the support was calcined in air for sixteen hours at 500° C.

In order to obtain a 9 wt.% silica loading on the alumina support two silane impregnations were required. After the first impregnation the silane was decomposed using a procedure similar to that for the 2 and 3.4 wt.% silica supports. After the the second impregnation, the sample was steamed at 120° C. for four hours, followed by 270° C. for two hours and finally for sixteen hours at 500° C. in a tube furnace in a flowing 80/20 helium/oxygen mixture that had been sparged through water. This steam treatment was done to reduce silane removal from the support during the decomposition. Following this, the 9% silica support was also calcined in air for 16 hours at 500° C.

After calcining the silica-doped alumina supports were impregnated with aqueous solutions of ammonium meta-tungstate using the incipient wetness technique. After impregnation, each sample was dried overnight in air at 120° C. followed by calcining in air for 16 hours at 500° C. In those cases where the catalyst was steamed after calcining, the steaming was accomplished by placing the sample in a quartz tube in a tube furnace and passing over same an 80/20 helium/oxygen mixture that had been sparged in water. As was the case in Example 1, the final catalyst compositions were pilled to a 20/40 mesh size.

These catalysts were evaluated for gas oil cracking activity using the MAT unit, procedure and feed of Example 1. The results of these experiments are given in Table 2 and again demonstrate the usefulness of the catalysts of this invention as acid cracking catalysts and the fact that low silica contents are preferred. The results also demonstrate that in those cases where the catalyst was calcined and then steamed at 870° C. as opposed to merely calcining, the steaming treatment resulted in greater activity.

TABLE 2

CRACKING PERFORMANCE OF $WO_3$ on $SiO_2$ - DOPED
$\gamma$-$Al_2O_3$ CATALYSTS IN MAT UNIT

| CATALYST | CALCINED/STEAMED 870° C. | SURFACE AREA $m^2/g$ | MAT ACTIVITY | COKE PRODUCING FACTOR | HYDROGEN PRODUCING FACTOR |
|---|---|---|---|---|---|
| 6% $WO_3$ on 2% $SiO_2/Al_2O_3$ | yes/no | | 30 | .59 | 3.5 |
| 6% $WO_3$ on 2% $SiO_2/Al_2O_3$ | yes/yes | | 36 | .70 | 2.9 |
| 10% $WO_3$ on 2% $SiO_2/Al_2O_3$ | yes/yes | 117 | 48 | 1.62 | 2.2 |
| 10% $WO_3$ on 3.4% $SiO_2/Al_2O_3$ | yes/yes | 138 | 51 | 1.06 | 4.7 |
| 6% $WO_3$ on 5% $SiO_2/Al_2O_3$ | yes/no | | 28 | .45 | 1.6 |
| 6% $WO_3$ on 5% $SiO_2/Al_2O_3$ | yes/yes | | 48 | .78 | 5.2 |
| 10% $WO_3$ on 9% $SiO_2/Al_2O_3$ | yes/yes | | 44 | 1.24 | 3.3 (?) |

What is claimed is:

1. A process for catalytically cracking a hydrocarbon feed and simultaneously generating a low BTU gas or hydrogen rich gas, said process comprising the steps of:
   (1) contacting, in a cracking zone and at elevated temperature, a hydrocarbon feed with an acid catalyst comprising a catalytic metal oxide component wherein said metal is selected from the group consisting of (a) tungsten, niobium and mixtures thereof, and (b) mixtures of (a) with tantalum, hafnium, chromium, titanium, zirconium and mixtures thereof, said metal oxide component being supported on a silica-containing inorganic refractory metal oxide support having a silica content of less than 50 wt.% of the total support, for a time sufficient to effect the desired cracking of the feed and yield a coked catalyst, said catalyst being steamed at a temperature of at least 600° C. prior to use;
   (2) regenerating the coked catalyst at regenerating conditions by contacting same with steam, an $O_2$-containing gas or mixture thereof to produce a regenerated catalyst and a gas consisting of an $H_2$ rich gas, a low BTU gas rich in CO and a combination thereof; and
   (3) recirculating the regenerated catalyst of step (2) back to the cracking zone of step (1).

2. The catalyst of claim 1 wherein said catalytic metal oxide component is present on the catalyst in an amount ranging from about 0.5 to 25 wt.% of the total catalyst composition.

3. The catalyst of claim 2 wherein said support comprises a mixture of silica and alumina.

4. The process of claim 3 wherein said hydrocarbon feed has a boiling point above about 1050° F.

5. The process of claim 4 wherein contacting of the hydrocarbon feedstream with the catalyst in step (1) is conducted at a temperature ranging from about 300°–900° C., a pressure of from about 0–10,000 psig, with a contact time ranging from about 1 to 2,000 seconds at from about 0.1 to 50 parts by weight of feed/hour/weight catalyst.

6. The process of claim 5 wherein the regeneration condition of step (2) include a temperature of from about 1400°–2800° F.

7. The process of claim 6 wherein said regeneration conditions include an oxidative atmosphere.

8. The process of claim 6 wherein said regeneration conditions include a steam atmosphere.

9. The process of either of claims 5, 7 or 8 wherein the silica content of said support is less than about 25 wt.% thereof.

10. The process of claim 9 wherein said alumina comprises a gamma alumina.

11. The process of claim 10 wherein water is present in said cracking zone at a water to hydrocarbon feed mole ratio ranging from about 0.5/1 to 20/1.

12. The process of claim 1 wherein the silica content of said support is less than about 15 wt.% thereof.

13. The process of claim 12 wherein said support consists essentially of a mixture of silica and alumina.

14. The process of claim 13 wherein said catalyst contains a promoter selected from the group consisting of oxides of barium, calcium, strontium and cesium, present on said catalyst in an amount ranging from about 0.01 to 4 wt. % of the total catalyst composition.

15. The process of claim 14 wherein said catalytic metal oxide component is selected from group consisting essentially of oxides of tungsten, niobium and mixtures thereof in combination with one or more oxides of tantalum, hafnium, chromium, titanium, zirconium and mixtures thereof.

16. A process for catalytically cracking a hydrocarbon feed and simultaneously generating a low BTU gas or hydrogen rich gas, said process comprising the steps of:

(1) contacting, in a cracking zone and at elevated temperature, a hydrocarbon feed with a solid acid catalyst comprising a catalytic metal oxide component supported on a silica-containing inorganic refractory oxide support, said support having a surface area of at least about 20 $m^2/g$ and a silica content, calculated as $SiO_2$, of less than 50 wt.%, wherein said catalytic metal is selected from the group consisting of (a) tungsten, niobium and mixtures thereof and (b) mixtures of (a) with tantalum, hafnium, chromium, titanium, zirconium and mixtures thereof, said catalyst being steamed at a temperature above about 600° C. prior to use:

(2) regenerating the coked catalyst at regenerating conditions by contacting same with steam, an $O_2$-containing gas or mixture thereof to produce a regenerated catalyst and a gas consisting of an $H_2$ rich gas, a low BTU gas rich in CO and a combination thereof; and (3) recirculating the regenerated catalyst of step (2) back to the cracking zone of step (1).

* * * * *